(12) United States Patent
Trainin et al.

(10) Patent No.: US 7,706,397 B2
(45) Date of Patent: Apr. 27, 2010

(54) APPARATUS AND METHOD OF CONTROLLING TRANSMISSION IN REVERSE DIRECTION

(75) Inventors: Solomon B. Trainin, Haifa (IL); Adrian Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 11/394,215

(22) Filed: Mar. 31, 2006

(65) Prior Publication Data

US 2007/0237169 A1  Oct. 11, 2007

(51) Int. Cl.
*H04L 12/413* (2006.01)
(52) U.S. Cl. .................................. 370/445; 370/447
(58) Field of Classification Search .............. 370/389, 370/441, 431, 464, 471, 442, 447, 450, 458, 370/508, 473, 445, 448, 459, 461, 462
See application file for complete search history.

(56) References Cited

U.S. PATENT DOCUMENTS

| 6,683,866 | B1 | 1/2004 | Stanwood et al. |
| 7,385,976 | B2 * | 6/2008 | Gu et al. ................ 370/389 |
| 7,539,930 | B2 * | 5/2009 | Ginzburg et al. ........... 714/788 |
| 2003/0039224 | A1 | 2/2003 | Koo et al. |
| 2004/0151126 | A1 | 8/2004 | Matsubara |
| 2005/0285719 | A1 | 12/2005 | Stephens |
| 2005/0286445 | A1 | 12/2005 | Stephens |
| 2006/0029073 | A1 * | 2/2006 | Cervello et al. ............. 370/389 |
| 2006/0083233 | A1 * | 4/2006 | Nishibayashi et al. ....... 370/389 |
| 2006/0227733 | A1 * | 10/2006 | Frederiks et al. ............ 370/310 |
| 2006/0227801 | A1 * | 10/2006 | Nanda et al. ................ 370/447 |

FOREIGN PATENT DOCUMENTS

WO  WO 2006 025655 A1  3/2006

OTHER PUBLICATIONS

HT MAC Specification, Enhanced Wireless Consortium publication, Version V1.1972005, Enhanced Wireless Consortium, pp. 1-83.

* cited by examiner

*Primary Examiner*—Brenda Pham
(74) *Attorney, Agent, or Firm*—Shiloh et al.

(57) ABSTRACT

Briefly, a wireless communication system that includes an Initiator and a Responder to transmit an aggregation of data units in a reverse direction is provided. The Initiator includes a medium access controller capable of allocating a time slot for exchanging one or more transmissions of aggregation of data units with the Responder. The medium access controller includes a channel access scheme, which is able to allocate the time slot for the Responder to transmit the aggregation of data units in the reverse direction, and to grant Originator rights of the Initiator to the Responder within said time slot.

31 Claims, 5 Drawing Sheets

APPARATUS AND METHOD OF CONTROLLING TRANSMISSION IN REVERSE DIRECTION

BACKGROUND OF THE INVENTION

A wireless local area network (WLAN) may include a basic service set (BSS). The BSS may include an access point (AP) and one or more stations (STA). The AP may transmit data frames to the one or more stations over a downlink channel and may receive data frames over an uplink channel. In a high throughput WLAN the uplink and the downlink channels may employ an intensive traffic of data frames. The BSS may include a Direct Link Service (DLS) to allow the stations to transfer data between the stations without the AP intervention. The sequence of frames that may be used to transmit data from one station to one or more other stations, and to receive a response(s) from the one or more stations, may be referred to as a transmit sequence. The transmit sequence may include an aggregation of data units which may be transmitted by an Initiator, and one or more response frames from a Responder. For example, the Initiator may be an AP and the Responder may be a mobile unit.

In WLAN a collision of transmissions from different mobile units and the AP may occur. In order to avoid collisions the AP may initiate a transmit opportunity (TxOP) time slot. In the TxOP time slot the AP, for example, an Initiator, may transmit data frames to a mobile station (e.g. a Responder). For example, according to IEEE 802.11e standard, only an owner of the TxOP may be allowed to transmit during the TxOP time slot. Thus, TxOP time slot may not be fully occupied by transmissions of the Initiator and the Responder.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes, medium access processor (MAC), digital signal processor (DSP) and/or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Figure 1:
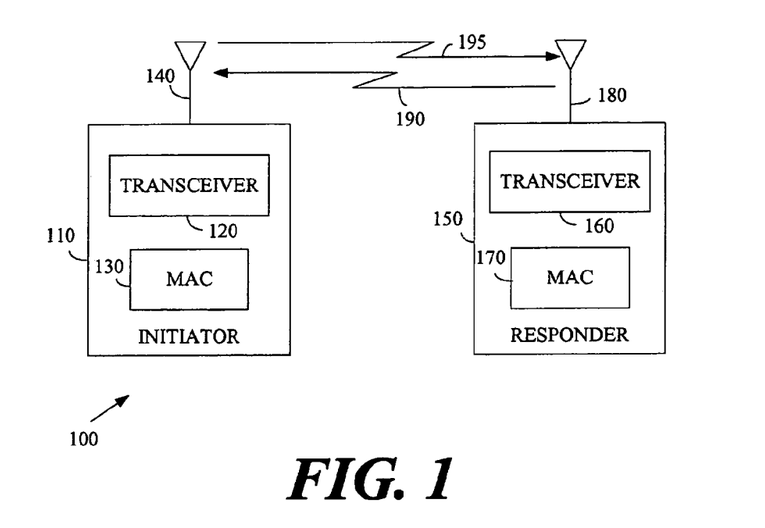
FIG. 1 is a schematic illustration of a wireless communication system according to an exemplary embodiment of the present invention.

Turning first to FIG. 1, a wireless communication system 100, for example, a WLAN, according to embodiments of the present invention, is shown. Although the scope of the present invention is not limited in this respect, the exemplary WLAN 100 may be defined, e.g., by IEEE 802.11-1999 standard family, as a basic service set (BSS). For example, the BSS may include a station 110 and station 120, if desired.

According to this exemplary embodiment of the present invention, stations 110 and 120 may transmit an aggregation of data units, if desired. For example, the transmission of the aggregation of data units may be done according to IEEE 802.11n/D1.0 standard which published on March 2006, if desired. Station 110, for example, an accesses point (AP), may be referred to herein as an Initiator and station 150, for example, a wireless mobile unit, may be referred to herein as a Responder.

According to this exemplary embodiment of the invention, station 110 may include a transceiver 120, a medium access controller (MAC) 130 and an antenna 140. Station 150 may include a transceiver 160, a MAC 170 and an antenna 180.

Although the scope of the present invention is not limited in this respect, at least one of antennas 140 and 180 or both of antennas 140 and 180 may include an omni-directional antenna, a monopole antenna, a dipole antenna, an end fed antenna, a circularly polarized antenna, a micro-strip antenna, a diversity antenna, an antenna array, an internal antenna or the like. It should be understood that in some embodiments of the invention stations 110 and 150 may include two or more antennas.

Although the scope of the present invention is not limited in this respect, Initiator 110 may exchange one or more transmissions of an aggregation of data units with Responder 150 within an allocated time slot which may be referred to in the context of with embodiments of the present invention as a transmit opportunity (TxOP). Initiator 120 may transmit the aggregation of data units over a downlink 190 and may enable Responder 150 to transmit the aggregation of data units in a reverse direction, e.g., over an uplink 195, by transferring its originator rights to the Responder 150. Thus, Responder 150 may be authorized to transmit the aggregation of data units within the time slot of TxOP.

Transceivers 120 and 160 may transmit and/or receive transmissions and MACs 130 and 170 may control the direction of transmission, allocate a TxOP, control data unit transportation over the WLAN according to a medium access scheme, for example, a Request_To_Send/Clear_To_Send (RTS/CTS) scheme, or the like.

Figure 2:
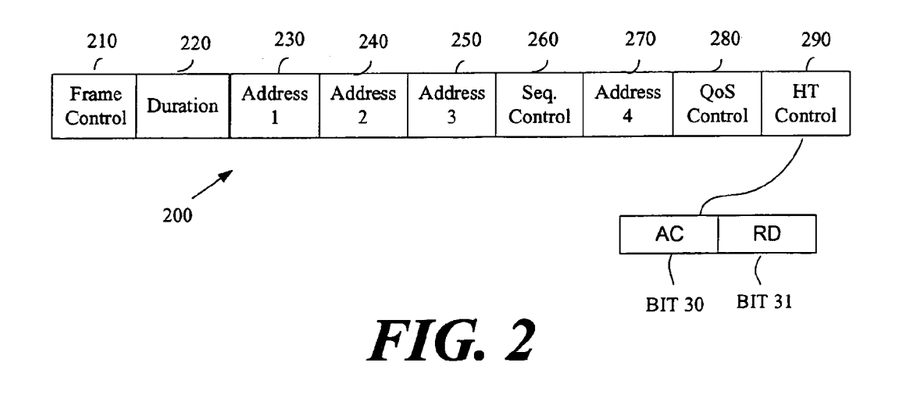
FIG. 2 is a schematic illustration of a data frame including data units according to some exemplary embodiments of the present invention.

Turning to FIG. 2, a schematic illustration of a data frame 200 including data units according to some exemplary embodiments of the present invention, is shown. Although the scope of the present invention is not limited in this respect, data frame 200 may include a MAC protocol Data Unit (MPDU) Header. According to this exemplary embodiment of the invention, the MPDU Header may include control data in one or more fields, and/or one or more bits to control the transportation of data units. A frame control field 210 may include a MPDU type and subtype and/or other related control bits. A duration field 220 may include a remaining TxOP time. Address fields 230, 240, 250 and 270 may be used for addressing a transferring source station, a destination station, and/or intermediate stations. A Sequence control field 260 may include sequence number of the MPDU. A quality of service (QoS) field 280 may be used for priority signaling. A High Throughput Control field 290 may include, for example, an Access Category (AC) Constrain flag (bit 30) and a Reverse Direction (RD) flag (bit 31) flags. For example, bit 31 may be used to set or reset the Originator rights of the stations, if desired. Bit 30 may be used to control insertion of AC data. For example, if bit 30 is reset, then insertion of AC data in the reverse direction may be allowed; else, insertion of AC data similar to the AC data sent by the Initiator may be allowed.

Figure 3:
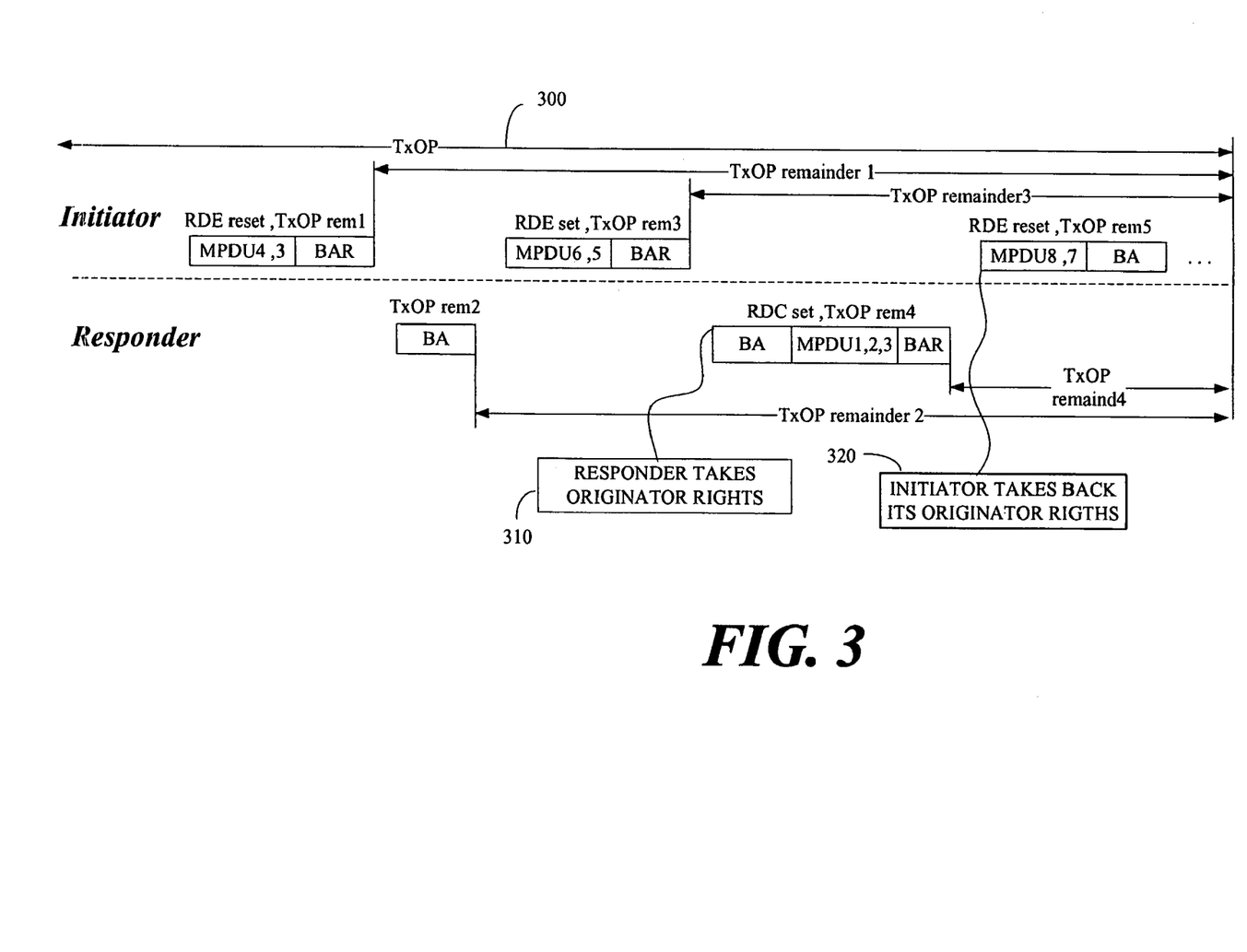
FIG. 3 is a schematic illustration of a procedure of data units between an Initiator and a Responder according to some exemplary embodiments of the present invention.

Turning to FIG. 3, a schematic illustration of a procedure for exchanging of data units between an Initiator and a Responder according to some exemplary embodiments of the present invention is shown. Although the scope of the present invention is not limited in this respect, a TxOP time slot 300 may be allocated by the Initiator, e.g., Initiator 110, to exchange an aggregation of data units with the Responder (e.g. Responder 150). The Initiator may transmit the aggregation of data unit, e.g., MPDU 4, 3, and a block acknowledge request (BAR) to the Responder. A HTC field 290 of MPDU header may include setting of a RD flag (e.g., bit 31) and a remaining time of TxOP in duration field 220.

According to this exemplary embodiment of the invention, the Initiator is the originator of the transmissions and may instruct the responder by resetting the RD flag (e.g., bit 31) to operate as a recipient. The responder may reply with a block acknowledgement (BA), and the remaining time of the TxOP (e.g., TxOP rem 2). In the next transmission, the Initiator may transmit MPDU 6, 5, BAR, the remaining time of TxOP (e.g., TxOP rem 3) and may enable the Responder to have the Originator rights by setting the RD flag (e.g., bit 31). In response, the Responder may take the Originator rights from the Initiator (text block 310) and may transmit a BA, MPDUs 1, 2, 3, BAR, the remaining time of the TxOP (e.g., TxOP rem 4) and may request from the Initiator to continue to transmit in the reverse direction by setting the RD flag (e.g., RDC set).

Although the scope of the present invention is not limited in this respect, the Initiator may take back its Originator rights from the Responder (text block 320). The Initiator may transmit to the Responder MPDU 8, 7 and a BA with RD flag reset and the remaining time of the TxOP (TxOP rem 5).

Figure 4:
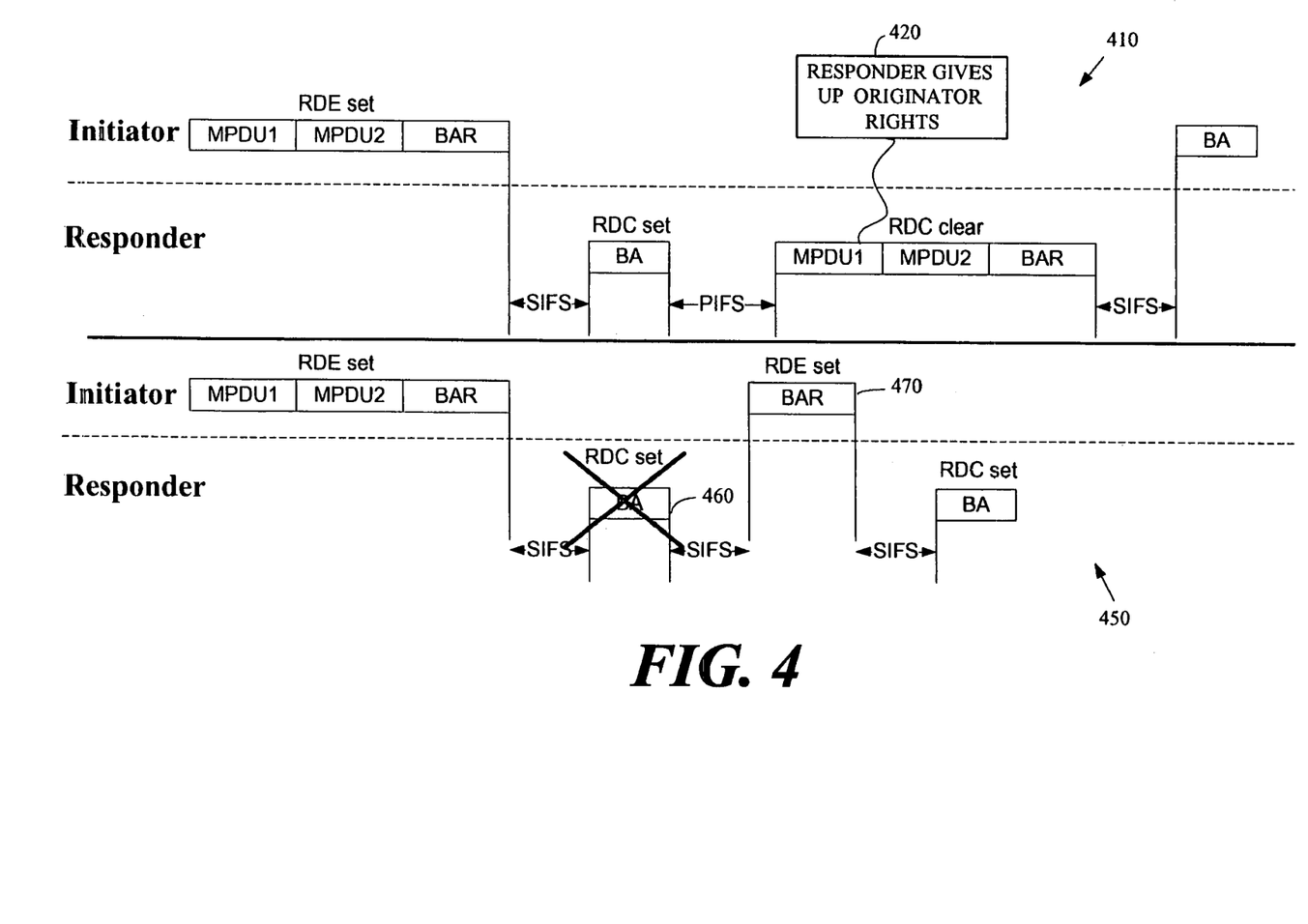
FIG. 4 is a schematic illustration of a procedure of data units between an Initiator and a Responder according to some other exemplary embodiments of the present invention.

Turning to FIG. 4, a schematic illustration of a procedure for exchanging data units between an Initiator and a Responder according to two other exemplary embodiments of the present invention is shown. Although the scope of the present invention is not limited in this respect, a first example 410 demonstrates the Responder that transmits a BA, then transmits the aggregation of data units, and then may return Originator rights to the Initiator (text block 420). A second example 450 demonstrates a failure in receiving a BA of the Responder.

More specifically, in the first example 410, the Initiator may transmit aggregation of data units, e.g., MPDU 1 and 2, with a BAR and may transfer its originator rights to the Responder by setting the RD flag. The Responder after a delay of a first predetermined time period, for example, a short interframe space (SIFS), may respond with a BA and setting of the RD flag. The Responder may, after a delay of a second predetermined time period, for example, a priority interframe space (PIFS), transmit the aggregation of data units (e.g., MPDU 1, 2) flowed by a BAR and returning the Originator rights to the Initiator (text block 420). The Initiator may respond after a delay of SIFS with a BA.

In the second example 450, the Initiator may not receive from the Responder the BA with the RD flag set after a delay of SIFS (as is shown with reference number 460). According to this example, the Initiator may retransmit after a delay of SIFS the BAR with the RD flag set (as is shown with reference number 470). The Responder may respond with the BA after a delay of SIFS, may set the RD flag, and may become the Originator. The Responder may then transmit aggregation of data units to the Initiator, if desired. Alternatively, the Responder may continue with aggregation of data unit after a delay of SIFS following the BA end, and the Initiator may wait a PIFS following the end of the expected BA to issue a BAR (470), although the scope of the present invention is not limited in this respect.

Figure 5:
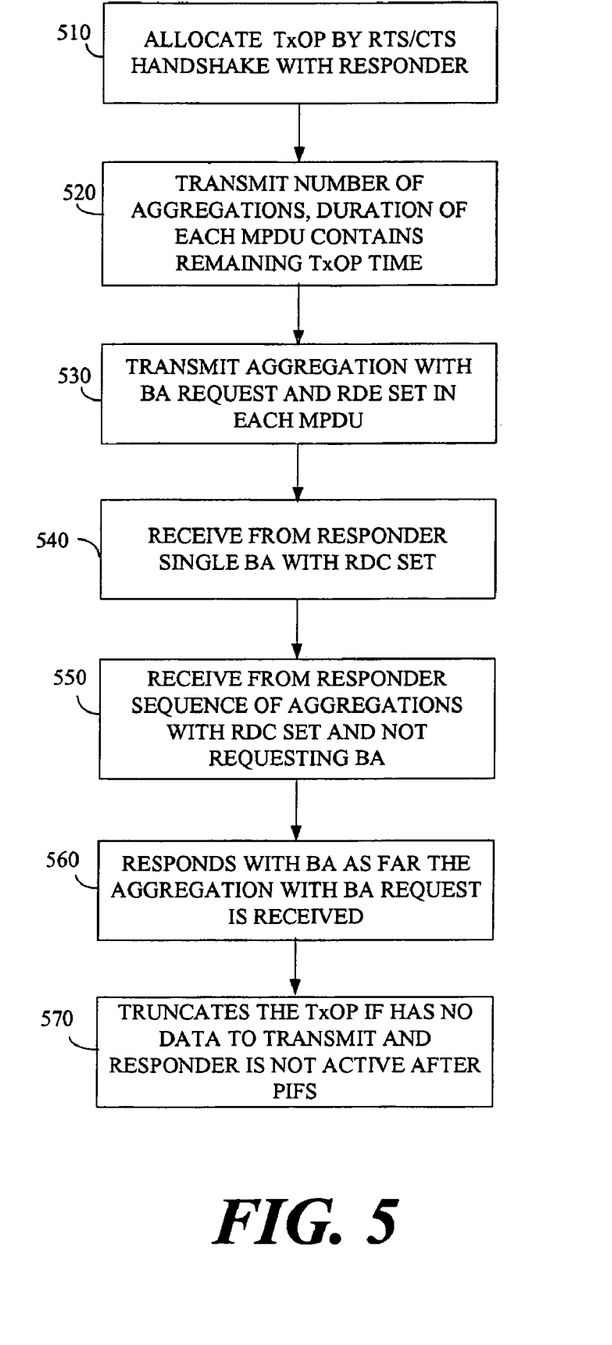
FIG. 5 is a schematic flow chart of a method of exchanging an aggregation of data units in a reverse direction during an allocated time slot by an Initiator according to some exemplary embodiments of the present invention.

Turning to FIG. 5, a flow chart of a method of exchanging aggregation of data units in a reverse direction during an allocated time slot by an Initiator according to some exemplary embodiments of the present invention is shown. Although the scope of the present invention is not limited in this respect, the Initiator (e.g., Initiator 110) may allocate a time slot for exchanging one or more transmissions of aggregation of data units (e.g., TxOP). The time slot may be allocated based on a channel access scheme, for example, RTS/CTS, that may perform a handshake procedure with the Responder, if desired (text block 510). The Initiator may transmit one or more MPDUs that may include a value of a remaining time of TxOP (text block 520). In addition, the Initiator may transmit the aggregation of data units with a BAR and the RD flag in the data units, e.g., MPDU may be set to a reverse direction enable (RDE) setting (text block 530).

According to some embodiments of the invention, the Initiator may receive from the Responder a single BA with the RD flag set to reverse direction continue (RDC) (text block 540). In some other embodiments of the invention, the Initiator may receive from the Responder sequences of aggregation of data units with RDC set and without requesting a BA (text block 550). The Initiator may respond with the BA as long as the aggregation of data units with BAR may be received (text block 560).

According to some embodiments of the invention, the Initiator may respond with a BA with at least one of the flowing settings and/or resettings of the RD flag in the BA. For example, the Initiator may take back its originator rights by resetting RDE in the BA. The Initiator may grant originator rights to the Responder by asserting the RDE in the BA. Furthermore, if RDC is set in a previous data unit, the Initiator may delay its transmission for a predetermined time, for example, PIFS, after sending the BA with the RDE reset. The PIFS delay may be needed to allow the Originator to transmit before or without receiving the BA.

According to some embodiments of the invention, the Initiator may truncate the TxOP time slot if there is no data units to transmit and the responder is not active after a predetermined delay e.g., PIFS (text block 570).

Figure 6:
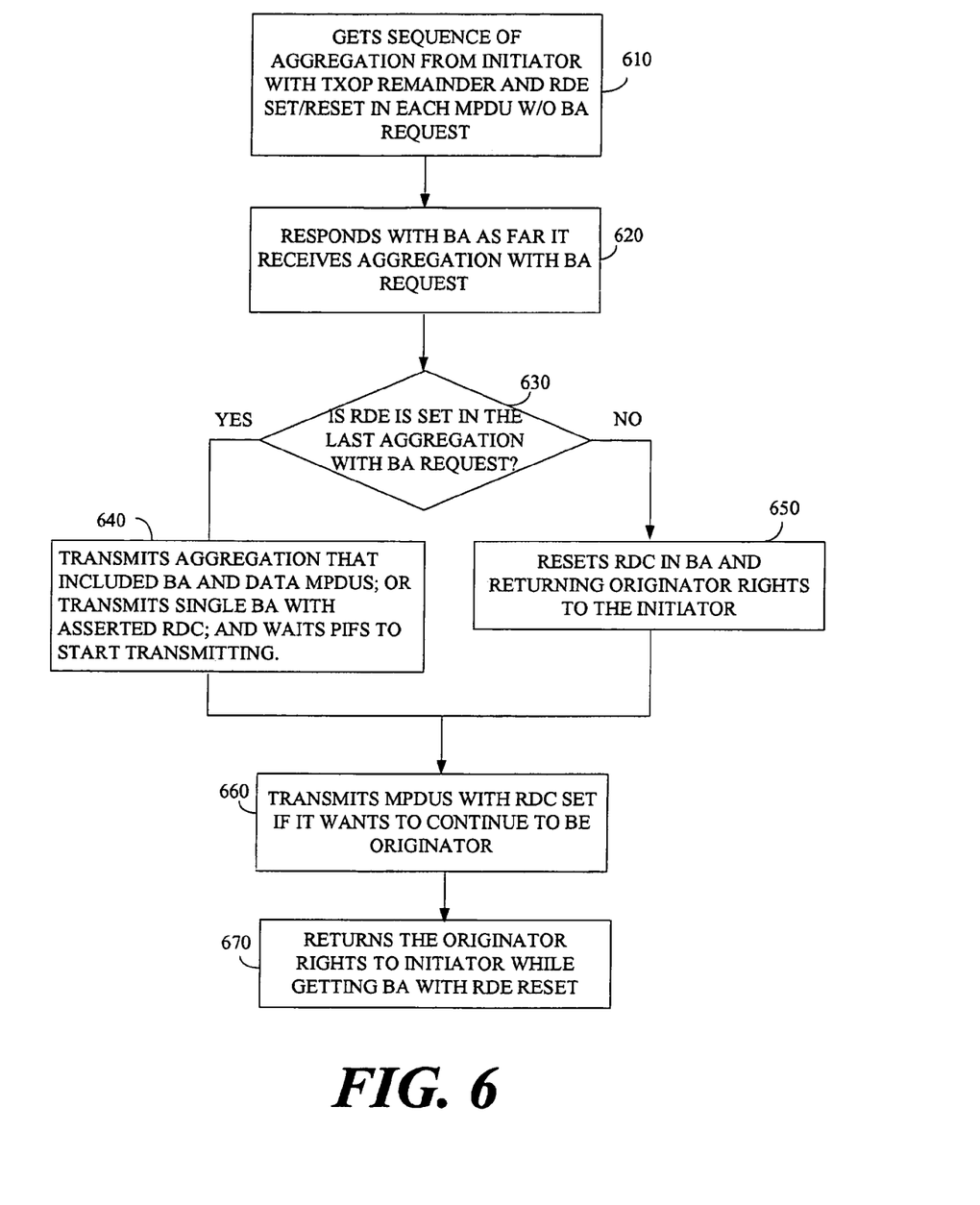
FIG. 6 is a schematic flow chart of a method of exchanging an aggregation of data units in a reverse direction during an allocated time slot by a responder according to some exemplary embodiments of the present invention.

Turning to FIG. 6 a flow chart of a method of exchanging aggregated data units in a reverse direction during an allocated time slot by a Responder according to some exemplary embodiments of the present invention is shown. Although the scope of the present invention is not limited in this respect, the Responder may receive a sequence or aggregation of data units from the Initiator with a remaining time of an allocated time slot for transmission (e.g. TxOP remainder) and a RDE set/reset in an MPDU with or without a BA request (text box 610). The Responder may respond with a BA as long as it receives aggregated data units with the BA request (text box 620).

According to some embodiments of the present invention, if the RD flag is set as RDE in the last received aggregation of data units with BAR (text block 630), then the Responder may transmit an aggregation of data units that includes the BA and the MPDUs. Alternatively, the Responder may transmit a single BA with a RD flag asserted as RDC and may wait a predetermined time period (e.g., PIFS) to start transmitting (text block 640). In some embodiments of the invention, the PIFS delay may be needed to allow the Originator to retransmit without receiving the BA.

According to some embodiments of the present invention, if the RD flag is set as RDC in the last received aggregation with BAR (text block 630), then the Responder may reset the RDC in the BA thus returning the Originator rights to the Initiator (text block 650). Furthermore, in order to keep the Originator rights, the Responder may transmit an aggregation of MPDUs with the RDC set, if desired (text block 660). In some other embodiments of the invention, the Responder may return the Originator rights to Initiator while receiving a BA with a RDE reset (text block 670).

Although the scope of the present invention is not limited in this respect, one event of fault resolution may be when an Originator does not receive an expected BA after sending BAR, and instead may receive, e.g., a PHY_Rx_Indication and may not receive a correct BA. The Originator may retransmit a BAR after a predetermined delay, for example, SIFS. Another event of fault resolution may be when the Originator expects to receive the BA and may not receive a PHY_Rx_Indication, in which case the Originator may retransmit the BAR after a predetermined delay for example, a PIFS, after an end of a last transmission.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    allocating, based on a channel access scheme of an initiator, a time slot for exchanging between the initiator and a responder one or more transmissions;
    enabling the responder to transmit to the initiator in a reverse direction by transferring to the responder originator rights of the initiator, wherein transferring the originator rights to the responder includes transmitting from the initiator to the responder a first aggregation of data units including a reverse direction flag bit set to a predefined reverse-direction-enable value;
    receiving from the responder in the reverse direction a block-acknowledgment including the flag bit set to a predefined reverse-direction-continue value and at least one second aggregation of data units at least an inter-frame-space period after the block acknowledgement; and
    enabling the initiator to transmit at least a third aggregation of data units by transferring back the originator rights from the responder to the initiator within the time slot, wherein the transferring back includes transmitting the third aggregation of data units including the reverse direction flag bit reset to a predefined reverse-direction-disable value.

2. The method of claim 1, wherein transmitting the flag bit set to the reverse-direction-enable value includes transmitting a block acknowledgement request including the flag bit set to the reverse-direction-enable value.

3. The method of claim 1, comprising:
if a block acknowledgement from the responder is not received at the initiator after at least a short-inter-frame-space period following the transmission of the flag bit set to the reverse-direction-enable value, transmitting to the responder a block acknowledgement request including the reverse direction flag bit set to the reverse-direction-enable value.

4. The method of claim 1, wherein receiving the reverse direction flag bit set to the reverse-direction-continue value and the second aggregation of data units includes receiving the second aggregation of data units including the reverse direction flag bit set to the predefined reverse-direction-continue value.

5. The method of claim 4, including receiving from the responder a subsequent aggregation of data units after receiving the second aggregation of data units including the reverse direction flag bit set to the predefined reverse-direction-continue value.

6. The method of claim 1, wherein each data unit of the first aggregation of data units includes the reverse direction flag bit set to the reverse-direction-enable value.

7. The method of claim 1, wherein each of the first, second, and third aggregations of data units includes an indication of a remainder of the time slot.

8. A Wireless communication device comprising:
a medium access controller to allocate, based on a channel access scheme of an initiator, a time slot for exchanging between the initiator and a responder one or more transmissions, and to enable the responder to transmit to the initiator in a reverse direction by transferring to the responder originator rights of the initiator, wherein the media access controller is to transfer the originator rights to the responder by transmitting from the initiator to the responder a first aggregation of data units including a reverse direction flag bit set to a predefined reverse-direction-enable value,
wherein the media access controller is to receive from the responder in the reverse direction a block-acknowledgment including the flag bit set to a predefined reverse-direction-continue value, and at least one second aggregation of data units at least an interframe-space period after the block acknowledgement,
and wherein the media access controller is to enable the initiator to transmit at least a third aggregation of data units by transferring back the originator rights from the responder to the initiator within the time slot, wherein the media access controller is to transfer back the originator rights from the responder to the initiator by transmitting the third aggregation of data units including the reverse direction flag bit reset to a predefined reverse-direction-disable value.

9. The wireless communication device of claim 8, wherein the medium access controller is capable of transmitting a block acknowledgement request including the flag bit set to the reverse-direction-enable value.

10. The wireless communication device of claim 8, wherein if a block acknowledgement from the responder is not received at the initiator after at least a short-inter-frame-space period following the transmission of the flag bit set to the reverse-direction-enable value, the medium access controller is to transmit to the responder a block acknowledgement request including the reverse direction flag bit set to the reverse-direction-enable value.

11. The wireless communication device of claim 8, wherein the medium access controller is capable of receiving from the responder the second aggregation of data units including the reverse direction flag bit set to the reverse-direction-continue value.

12. The wireless communication device of claim 11, wherein the medium access controller is capable of receiving from the responder a subsequent second aggregation of data units after receiving the second aggregation of data units including the reverse direction flag bit set to the reverse-direction-continue value.

13. The wireless communication device of claim 8, wherein each data unit of the first aggregation of data units includes the reverse direction flag bit set to the reverse-direction-enable value.

14. The wireless communication device of claim 8, wherein each of the first, second, and third aggregations of data units includes an indication of a remainder of the time slot.

15. A wireless communication system comprising:
an initiator configured to communicate with a responder, wherein the initiator is to allocate, based on a channel access scheme of the initiator, a time slot for exchanging between the initiator and the responder one or more transmissions, and to enable the responder to transmit to the initiator in a reverse direction by transferring to the responder originator rights of the initiator,
wherein the initiator is to transfer the originator rights to the responder by transmitting from the initiator to the responder a first aggregation of data units including a reverse direction flag bit set to a predefined reverse-direction-enable value,
wherein the initiator is to receive from the responder in the reverse direction a block-acknowledgment including the flag bit set to a predefined reverse-direction-continue value, and at least one second aggregation of data units at least an interframe-space period after the block acknowledgement,
wherein the initiator is to transfer back the originator rights from the responder to the initiator within the time slot by transmitting a third aggregation of data units including the reverse direction flag bit reset to a predefined reverse-direction-disable value.

16. The wireless communication system of claim 15, wherein the initiator is capable of transmitting a block acknowledgement request including the flag bit set to the reverse-direction-enable value.

17. The wireless communication system of claim 15, wherein if a block acknowledgement from the responder is not received at the initiator after at least a short-inter-frame-space period following the transmission of the flag bit set to the reverse-direction-enable value, the initiator is to transmit to the responder a block acknowledgement request including the reverse direction flag bit set to the reverse-direction-enable value.

18. The wireless communication system of claim 15, wherein the initiator is capable of receiving from the responder the second aggregation of data units including the reverse direction flag bit set to the reverse-direction-continue value.

19. The wireless communication system of claim 18, wherein the initiator is capable of receiving from the responder a subsequent second aggregation of data units after receiving the second aggregation of data units including the reverse direction flag bit set to the reverse-direction-continue value.

20. The wireless communication system of claim 15, wherein each data unit of the first aggregation of data units includes the reverse direction flag bit set to the reverse-direction-enable value.

21. The wireless communication system of claim 15, wherein each of the first, second, and third aggregations of data units includes an indication of a remainder of the time slot.

22. A wireless communication device comprising:
   a transmitter operably coupled to at least one dipole antenna; and
   a medium access controller to allocate, based on a channel access scheme of the media access controller, a time slot for exchanging with a responder one or more transmissions, and to enable the responder to transmit in a reverse direction by transferring to the responder originator rights,
   wherein the media access controller is to transfer the originator rights to the responder by controlling the transmitter to transmit to the responder a first aggregation of data units including a reverse direction flag bit set to a predefined reverse-direction-enable value,
   wherein the media access controller is to receive from the responder in the reverse direction a block-acknowledgment including the flag bit set to a predefined reverse-direction-continue value and at least one second aggregation of data units, at least an interframe-space period after the block acknowledgement,
   wherein the media access controller is to transfer back the originator rights from the responder by controlling the transmitter to transmit a third aggregation of data units including the reverse direction flag bit reset to a predefined reverse-direction-disable value.

23. The wireless communication device of claim 22, wherein the medium access controller is capable of controlling the transmitter to transmit a block acknowledgement request including the flag bit set to the reverse-direction-enable value.

24. An article comprising a computer-readable storage medium having stored thereon instruction that, when executed, result in:
   allocating, based on a channel access scheme of an initiator, a time slot for exchanging between the initiator and a responder one or more transmissions;
   enabling the responder to transmit to the initiator in a reverse direction by transferring to the responder originator rights of the initiator, wherein transferring the originator rights to the responder includes transmitting from the initiator to the responder a first aggregation of data units including a reverse direction flag bit set to a predefined reverse-direction-enable value;
   receiving from the responder in the reverse direction a block-acknowledgment including the flag bit set to a predefined reverse-direction-continue value, and at least one second aggregation of data units at least an interframe-space period after the block acknowledgement; and
   enabling the initiator to transmit at least a third aggregation of data units by transferring back the originator rights from the responder to the initiator within the time slot, wherein the transferring back includes transmitting the third aggregation of data units including the reverse direction flag bit reset to a predefined reverse-direction-disable value.

25. The article of claim 24, wherein the instructions, when executed, result in:
   receiving from the responder a block acknowledgement including the reverse direction flag bit set to the predefined reverse-direction-continue value, and, receiving the second aggregation of data units following the block acknowledgement.

26. The article of claim 25, wherein receiving the second aggregation of data units includes receiving the second aggregation of data units at least a priority-interframe-space period after the block acknowledgement.

27. The article of claim 24, wherein transmitting the flag bit set to the reverse-direction-enable value includes transmitting a block acknowledgement request including the flag bit set to the reverse-direction-enable value.

28. The article of claim 24, wherein the instructions, when executed, result in:
   if a block acknowledgement from the responder is not received at the initiator after at least a short-inter-frame-space period following the transmission of the flag bit set to the reverse-direction-enable value, transmitting to the responder a block acknowledgement request including the reverse direction flag bit set to the reverse-direction-enable value.

29. The article of claim 24, wherein receiving the reverse direction flag bit set to the reverse-direction-continue value and the second aggregation of data units includes receiving the second aggregation of data units including the reverse direction flag bit set to the reverse-direction-continue value.

30. The article of claim 24, wherein each data unit of the first aggregation of data units includes the reverse direction flag bit set to the reverse-direction-enable value.

31. The article of claim 24, wherein each of the first, second, and third aggregations of data units includes an indication of a remainder of the time slot.

* * * * *

UNITED STATES PATENT AND TRADEMARK OFFICE
CERTIFICATE OF CORRECTION

| | | |
|---|---|---|
| PATENT NO. | : 7,706,397 B2 | Page 1 of 1 |
| APPLICATION NO. | : 11/394215 | |
| DATED | : April 27, 2010 | |
| INVENTOR(S) | : Solomon B. Trainin et al. | |

It is certified that error appears in the above-identified patent and that said Letters Patent is hereby corrected as shown below:

In column 6, line 55, in claim 1, delete "value" and insert -- value, --, therefor.

In column 7, line 29, in claim 8, delete "Wireless" and insert -- wireless --, therefor.

In column 8, line 21, in claim 15, delete "configured to communicate" and insert -- capable of communicating --, therefor.

In column 8, line 40, in claim 15, before "wherein" insert -- and --.

In column 9, line 29, in claim 22, before "wherein" insert -- and --.

In column 9, line 39, in claim 24, delete "computer-readable" and insert -- computer readable --, therefor.

In column 9, line 40, in claim 24, delete "instruction" and insert -- instructions --, therefor.

Signed and Sealed this

Third Day of August, 2010

David J. Kappos
*Director of the United States Patent and Trademark Office*